United States Patent
Makita et al.

(10) Patent No.: US 6,525,262 B1
(45) Date of Patent: *Feb. 25, 2003

(54) SOLAR CELL MODULE ARRAY AND METHOD FOR INSTALLING SOLAR CELL MODULES

(75) Inventors: Hidehisa Makita, Kyotanabe (JP); Yuji Inoue, Nara (JP); Satoru Shiomi, Kyotanabe (JP); Makoto Sasaoka, Kyotanabe (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,871

(22) Filed: Dec. 29, 1998

(30) Foreign Application Priority Data

Jan. 6, 1998 (JP) .............................. 10-000851

(51) Int. Cl.[7] ......................... H01L 25/00; H01L 31/00; E04H 14/00; E04D 13/18; F24D 2/46
(52) U.S. Cl. .................. 136/244; 136/291; 52/173.3; 126/621; 126/622; 126/623
(58) Field of Search ................. 136/244, 291; 52/173.3; 126/623, 622, 621

(56) References Cited

U.S. PATENT DOCUMENTS

| 3,562,020 A | * | 2/1971 | Blevins | 136/89 |
|---|---|---|---|---|
| 4,341,607 A | * | 7/1982 | Tison | 204/129 |
| 4,353,161 A | | 10/1982 | Turner | 29/572 |
| 4,606,157 A | * | 8/1986 | Esposito | 52/173 |
| 4,624,084 A | * | 11/1986 | Esposito | 52/173 |
| 5,092,939 A | * | 3/1992 | Nath et al. | 136/251 |
| 5,118,361 A | | 6/1992 | Fraas et al. | 136/246 |
| 5,131,241 A | | 7/1992 | Newman | 136/291 |
| 5,213,626 A | | 5/1993 | Paetz | 136/244 |
| 5,232,518 A | * | 8/1993 | Nath et al. | 136/251 |
| 5,478,407 A | * | 12/1995 | Dorison et al. | 136/244 |
| 5,542,989 A | * | 8/1996 | Ichikawa | 136/251 |
| 5,616,185 A | | 4/1997 | Kukulka | 136/244 |
| 5,651,837 A | * | 7/1997 | Ohtsuka et al. | 136/251 |
| 5,779,817 A | | 7/1998 | Wecker | 136/244 |

FOREIGN PATENT DOCUMENTS

| EP | 0 751 576 | 1/1997 |
|---|---|---|
| JP | 6-311651 | 11/1994 |

OTHER PUBLICATIONS

Patent Abstracts of Japan, vol. 098, No. 003, Feb. 1998 for JP 9–294340.
Patent Abstracts of Japan, vol. 095, No. 002, Mar. 1995 for JP 6–311651.

* cited by examiner

*Primary Examiner*—Harold Pyon
*Assistant Examiner*—Michael C Miggins
(74) *Attorney, Agent, or Firm*—Fitzpatrick, Cella, Harper & Scinto

(57) ABSTRACT

This invention provides a solar cell module array comprised of two or more different types of modules, wherein said two or more different types of modules are rectangular, having different lengths and method for installing solar cell modules.

41 Claims, 12 Drawing Sheets

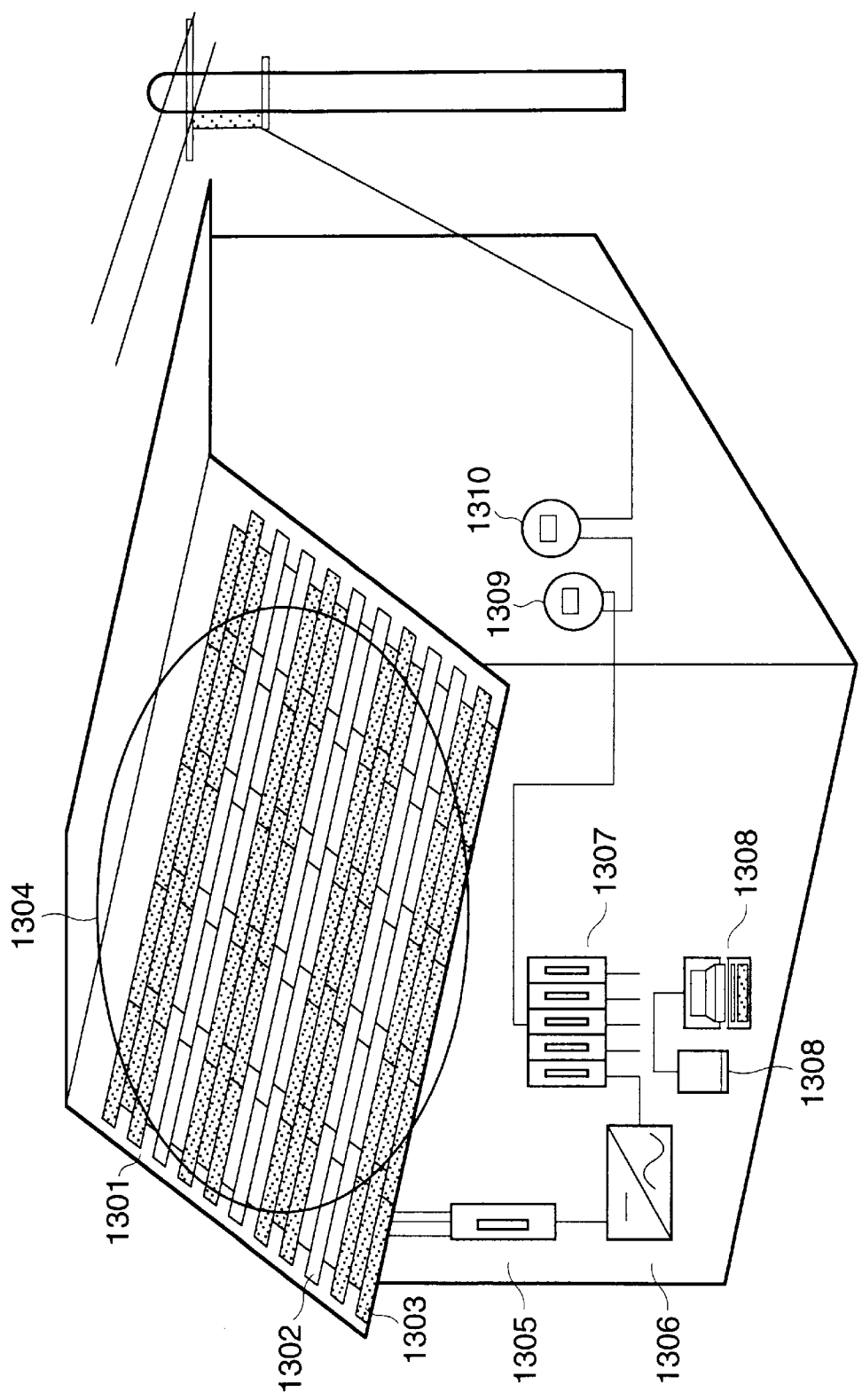

SOLAR CELL MODULE ARRAY AND METHOD FOR INSTALLING SOLAR CELL MODULES

BACKGROUND OF THE INVENTION

1. Field of the Invention

This invention relates to solar cell module array and method for installing solar cell modules.

2. Related Background Art

Recently, solar power generation has been attracting much attention because of its cleanness, viewed from resources- and energy-saving considerations, and is gradually going into the domestic area. At present, the solar cell modules are installed on existing facilities, such as house roofs and building walls, and newly built facilities represented by frames on the ground and building roofs. These modules are installed on, e.g.,:

(1) frames, and
(2) roofs, in which they are assembled to form monolithic structures.

Generally, a plurality of solar cells are electrically connected to each other, to form a solar cell module array.

The solar cell modules are combined with each other for practical use, and generally shaped in such a way that they are compatible with each other. Therefore, they are rectangular or virtually triangular (virtually right triangular) in the case of (1), and shaped to be easily adaptable to rectangular roofs in the case of (2).

The modules falling into the category (1) are mounted on a frame, built to securely hold them. The modules commercialized at present are shaped rectangular or square, or virtually triangular. They are installed by a method in which a plurality of the same type of rectangular modules are combined with each other to form an array, or another method in which one type of rectangular module(s) and another type of triangular module(s) are combined with each other. The latter method is suitably used on a hip roof: when rectangular modules are installed on a hip roof, because there are dead spaces, right triangular in each row, formed in the vicinity of the corners, and it is possible to install more modules and increase output by installing triangular modules in the dead spaces.

FIG. 1 illustrates the conventional arrangement in which rectangular modules are combined with triangular modules, where 201 is a plane on which the modules are set, 202 is a rectangular module and 203 is a triangular module.

On the other hand, the modules falling into the category (2), where they are assembled in a roof to form a monolithic structure, are shaped generally similar to the roof. Needing no frame, they are assembled more easily and cause no damage of the beauty. They are mostly rectangular, and a plurality of modules of the same type are assembled to form an array.

FIG. 2 illustrates the conventional arrangement in which only rectangular modules are used, where 204 is a plane on which the modules are set, and 205 is a rectangular module.

As described above, it is common to assemble solar cell modules of the same size into an array, when modules of the same type are to be used.

However, there are many roof types, e.g., hip, gale, square and irimoya (gable type in the upper, with 4 roof planes in the lower). Therefore, it is difficult for the conventional module installation method to efficiently arrange them. The problems are described concretely, below:

FIGS. 3A and 3B show rectangular solar cells arranged on a trapezoidal plane, seen in a hip roof or the like, by the conventional method in which modules of the same type are assembled, where 1401 is a plane on which the modules are set, 1403 is a rectangular module and 1402 is a dead space. Generally, solar cells cannot be cut freely on the site, and a dead space is formed on the plane, irrespective of modular width, as shown in the figure (gray portion).

Therefore, triangular modules have been used to minimize the dead space, which however, involves some problems, for example, when the triangular module and plane on which the modules are set are slanted at significantly different angles. This is illustrated in FIG. 4, where 1501 is a plane on which the modules are set, 1503 and 1504 are rectangular and triangular modules, respectively, and 1502 is a dead space. As shown, it is difficult for the conventional method to arrange triangular modules efficiently. The dead space could be greatly reduced, when triangle modules of varying angle are arranged on each plane. This, however, should increase module production cost, both for triangular modules and matching rectangular modules.

FIGS. 5A and 5B illustrate solar cell modules each consisting of a plurality of rectangular cells, where 1601 is a rectangular module and 1603 is a rectangular cell in FIG. 5A, and 1602 is a triangular module and 1603 is a rectangular cell (the same one as that in FIG. 5A) in FIG. 5B.

For modules assembled in a roof, the upper and lower joints must deviate from each other (tongue-and-groove joint) for weathering considerations, and triangular modules cannot be efficiently arranged in this case. This type of module is generally narrow, increasing module production and installation costs, when a triangular module is used, because of decreased unit module area and increased area on which narrow modules are installed.

The dead space could be reduced to use the installation plane more efficiently by decreasing size of each rectangular module, which, however, should greatly increase the installation cost, because of increased number of cells to be electrically connected to each other and of increased difficulty of installation.

This also causes another module installation problem, i.e., significantly limited array design resulting from narrowed range of inverter input voltage.

For example, consider the following procedural steps for array design and module installation:

1) Determination of solar cell modules and inverters to be used
2) Calculation of maximum number of solar cells which can be installed on a plane
3) Determination of number of cells for each string from a range of inverter input voltage
4) Determination of number of modules to be connected in series, from the number of cells determined in the step 3)
5) Determination of maximum numbers of cells to be connected in series and parallel, which satisfy the cell number limitation determined in the step 2)

In this case, number of modules to be connected in series is limited from the range of inverter input voltage, when only modules of the same type are used. As a result, number of cells may be limited to below the allowable level for the installation plane or string.

SUMMARY OF THE INVENTION

It is an object of the present invention to provide methods for installing solar cell module arrays and solar cell modules, which reduce a dead space and allow more efficient utilization of the plane on which the modules are set by solving the above problems.

It is an object of the present invention to provide a solar cell module array comprising two or more different types of modules, wherein said two or more different types of modules are rectangular, having different lengths from each other.

It is another object of the present invention to provide a roof provided with a solar cell system comprised of two or more different types of solar cell modules installed on a given plane, wherein said two or more different types of modules are rectangular, having different lengths from each other.

It is further object of the present invention to provide a method for installing two or more different types of solar cell modules on a given plane, wherein said two or more different types of modules are rectangular, having different lengths from each other.

BRIEF DESCRIPTION OF THE DRAWINGS

FIG. 20 illustrates solar cell module arrays installed by the method of the present invention, connected to a utility power supply system for a residence (oblique view).

DETAILED DESCRIPTION OF THE PREFERRED EMBODIMENTS

The solar cell module array installed by the method of the present invention will bring about the following effects. It is possible to reduce magnitude of dead spaces, produced at the edges of a plane of varying type on which rectangular solar cell modules are installed, by arranging rectangular modules of varying length. It is also possible to form a solar cell module array more efficiently by arranging rectangular modules of varying length.

Figure 1:
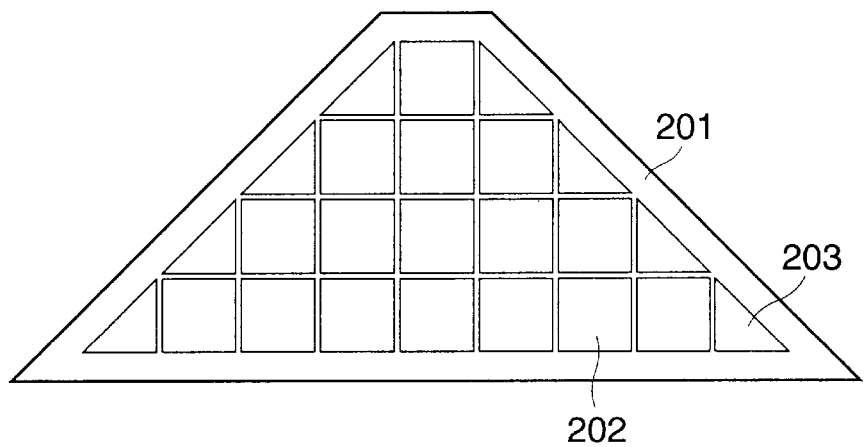
FIGS. 1, 2, 3A, 3B and 4 illustrate solar cell modules installed by the conventional methods.
Figure 2:
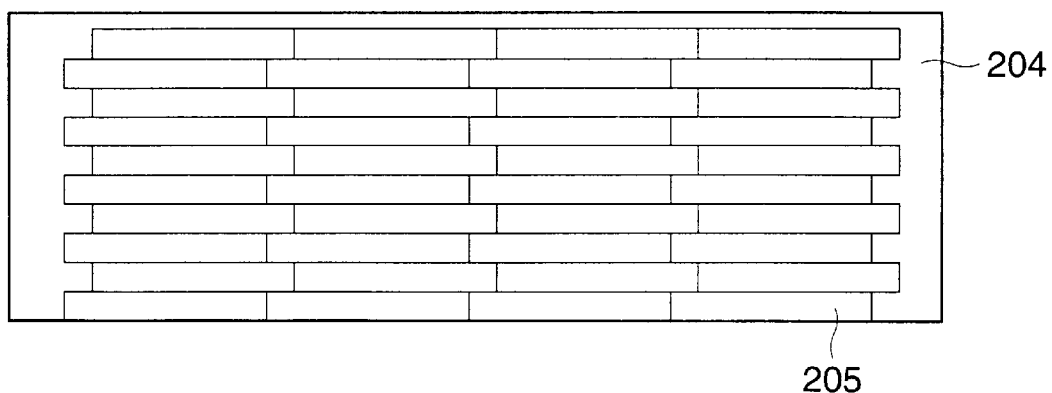
Figure 3A:
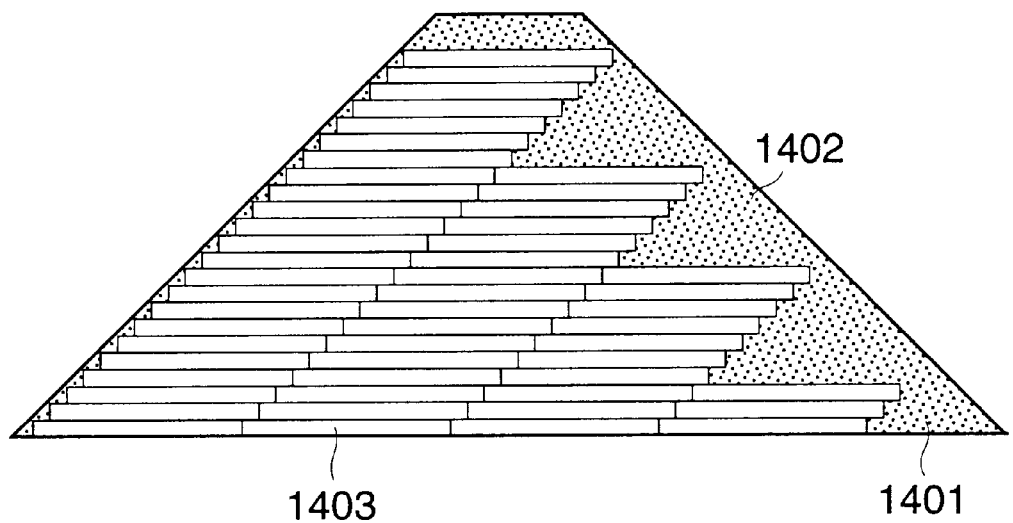
Figure 3B:
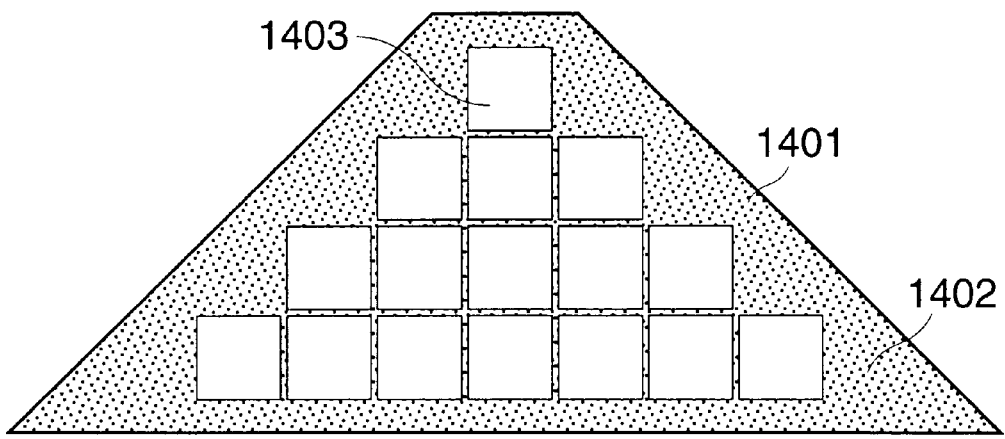
Figure 4:
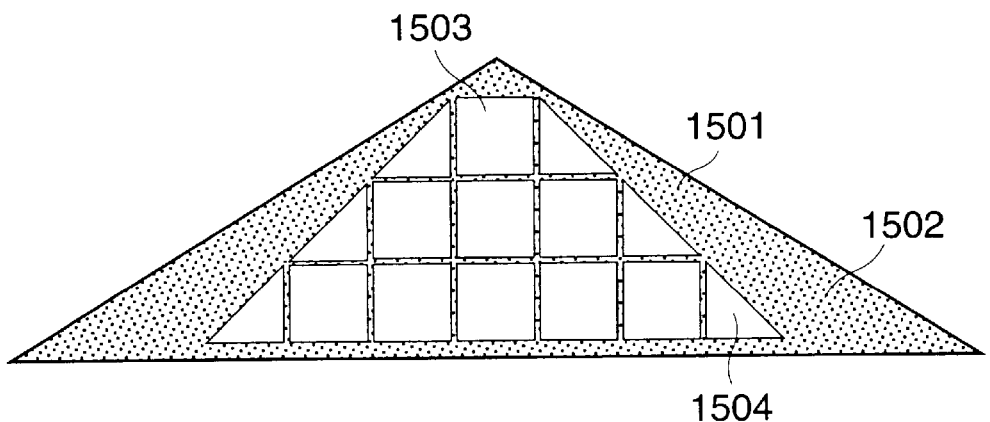
Figure 5A:
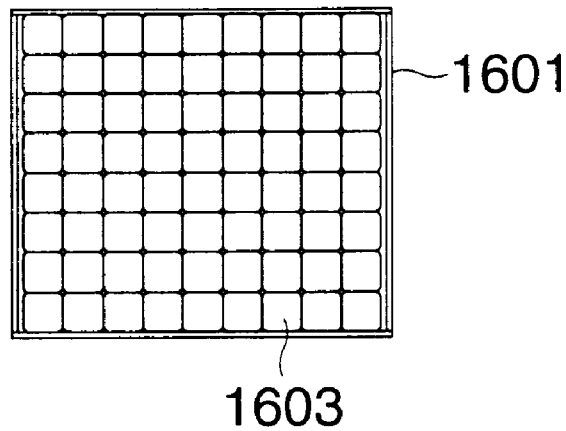
FIGS. 5A and 5B illustrate rectangular and triangular solar cell modules, respectively, installed by the conventional methods.
Figure 5B:
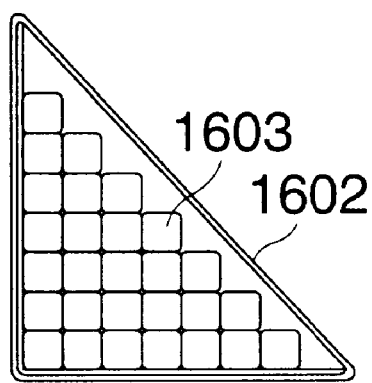
Figure 6:
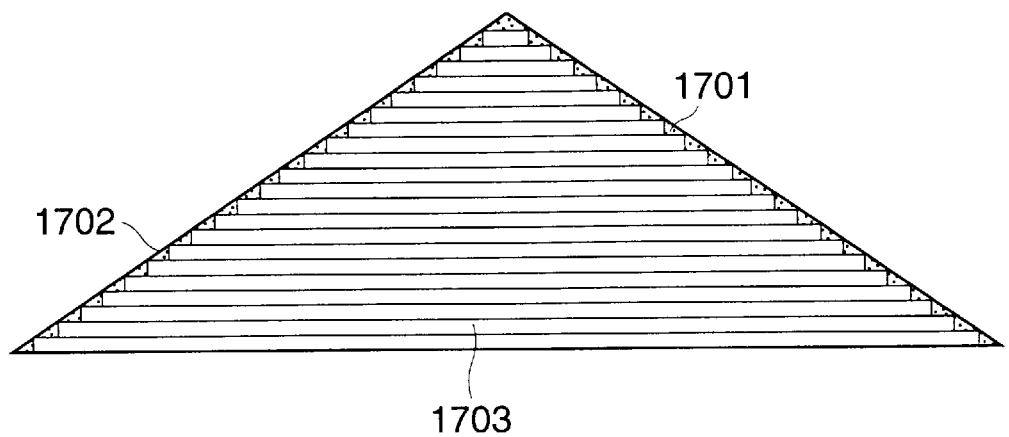
FIG. 6 illustrates solar cell modules installed on a triangular plane by the method of the present invention.
Figure 7:
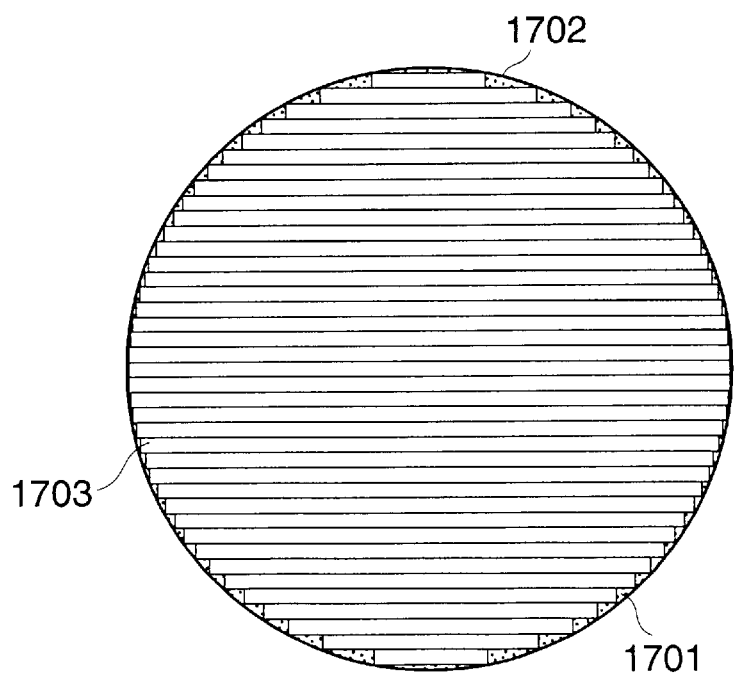
FIG. 7 illustrates solar cell modules installed on a circular plane by the method of the present invention.

FIG. 6 illustrates one example of arranging narrow, long, rectangular solar cell modules on a triangular plane, where these modules are different in length from each other row by row. FIG. 7 illustrates another example of arranging narrow, long, rectangular solar cell modules on a circular plane, these modules being also different in length from each other row by row. In FIGS. 6 and 7, 1701 is a plane on which the modules are set, 1703 is a rectangular module and 1702 is a dead space. As shown, rectangular modules are arranged more efficiently, producing smaller dead spaces, on planes of different shape by the method of the present invention.

The above array, consisting of rectangular solar cell modules, is applicable to the modules integral with a building part to form a monolithic structure. When they are assembled in a roof, the dead space is largely filled by the non-solar cell modules, to improve reliability with respect to weathering and the like, while causing no appearance-related problems.

When narrow rectangular solar cell modules of varying length are arranged to form a string, it is possible to easily connect them in series by making their electric current characteristics almost the same. Because no loss of output is anticipated when they have almost the same electric current characteristics, unlike the case in which 2 types of modules of different length and electric current characteristics are connected in series.

It is possible to limit module types to several types over an entire installation plane by combining rectangular solar cell modules of varying length for one row, allowing several types of modules of varying length to cover various planes of varying shape. In the cases shown in FIGS. 6 and 7, for example, the same module type is used for each row. On the other hand, it is no longer necessary to use modules of varying length row by row, when modules of varying length are used for each row, thus improving productivity and installation efficiency.

In the above case, the modules of varying length can be installed row by row, when they have the same width, facilitating wiring works and improving installation efficiency. This also causes no appearance-related problems. Use of modules of the same width is also favorable with respect to productivity, because length is the only variable depending on cell number.

It is possible to easily connect cells in series for each rectangular module and to have the module of almost the same electric current characteristics, when the cells that constitute each module have almost the same area. As a result, the modules can be also easily connected in series. Use of the cells of almost the same area for each module is favorable for narrow modules.

It is possible to minimize width of the narrow, rectangular module, when the cell has almost the same width as the module, thus minimizing dead space.

It is possible to easily form rectangular modules whose length matches that of the cells that constitute the module by keeping length of the module at the ratios of whole numbers of the cell lengths.

String voltage is traditionally kept constant for forming an array. However, this limitation will no longer hold by introducing a concept of dissimilar series connection in which strings of different voltage are connected in parallel. As a result, freedom of installing rectangular solar cell modules increases, improving installation efficiency in the array design for planes of varying shape.

Figure 8:
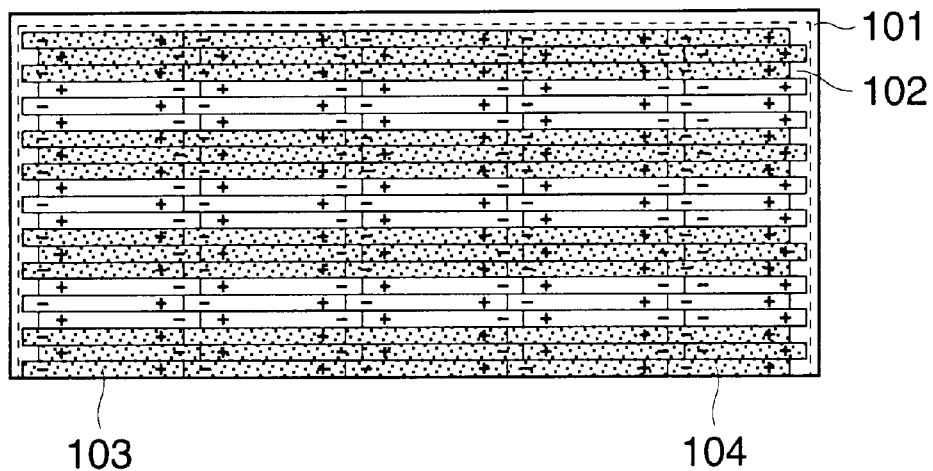
FIG. 8 illustrates a roof on which solar cell modules are installed by the method of the present invention.

FIG. 8 illustrates solar cell modules assembled in a roof by the method of the present invention, where 101 is an installation plane, 102 is an installation-feasible range, within the boundary limited by the dotted lines, in which the modules are possibly set, and 103 and 104 are each solar cell module.

[Installation planes]

In FIG. 8, the installation plane means the planes on which the modules are set. Those provide the installation plane include, but not limited to, existing roof, field slope not covered with a roofing material, waterproof sheet and frame.

[Installation-feasible range]

It is desirable that the following conditions are satisfied, when solar cell modules are set on a plane:

(In the case of setting the modules on a frame)

(1) The roof on which the modules are set must withstand anticipated loads (module weight, snowfall, wind pressure, etc.)

(2) The modules are preferably not set on a edge of eaves, verge or ridge, which have a higher wind power coefficient than the roof center, in consideration of wind pressure.

(In the case of the modules integral with a roof)

In the case of the modules integral with a roof, solar cell modules can be arranged in a manner similar to that used for common roofing materials, except that they cannot be cut freely. It is therefore necessary to carefully consider in this case how they are arranged on a verge, hip valley or ridge cover. A roof or frame surface cannot be totally used for solar module arrangement, and there is an installation-feasible range, such as the boundary limited by the dotted lines in FIG. 8.

[Solar battery]

(Solar cell)

The solar cells to be installed by the method of the present invention include, but not limited to, single-crystalline, polycrystalline, microcrystalline and amorphous cells. The rectangular solar cell modules to be installed by the method of the present invention preferably have almost the same electric current characteristics. When the modules of almost the same electric current characteristics are connected to each other in series, the total output is the sum of the output of each module in the series, whereas when the modules of different electric current characteristics are connected, the total output is less than the sum of the output of each module, causing output loss. In an extreme case, the total output of the series may be even lower than the output of the individual cell, when their electric current characteristics are widely different. For the rectangular modules of varying length to have almost the same electric current characteristics, it is preferable that the base cells that constitute the module have almost the same electric current characteristics and area, and connected to each other in series or parallel. Arrangement of these cells in series or parallel to have the module of desired electric current characteristics is complicated, when their electric current characteristics are different.

Some examples of the solar cell modules of the above configurations are described below:

(Solar cell modules set on a frame)

Figure 9:
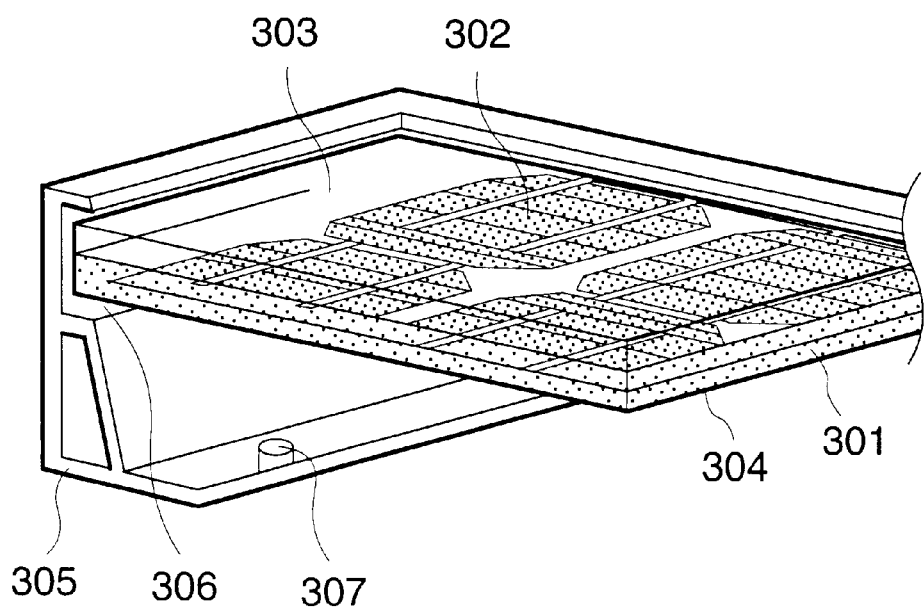
FIG. 9 illustrates solar cell modules installed on a frame (in oblique view)

The solar cell modules to be set on a frame include, but not limited to, single-crystalline, polycrystalline, microcrystalline and amorphous cells. It is preferable that the cells having almost the same area are connected in series/parallel or totally series. FIG. 9 illustrates one example of arrangement of the solar cell modules set on a frame. The configuration is characterized by a solar cell 302 sealed by a filler 301 to be weather-proof, which is placed between a front cover 303 as the light-receiving surface and a back cover 304 in the rear. The module is bonded to a frame 305 by a sealant 306 at the ends to improve sealing characteristics, and holes 307 for the fixing is provided to the longer frame side in the rear of the modules.

(Solar cell modules integral with a roof)

Figure 10:
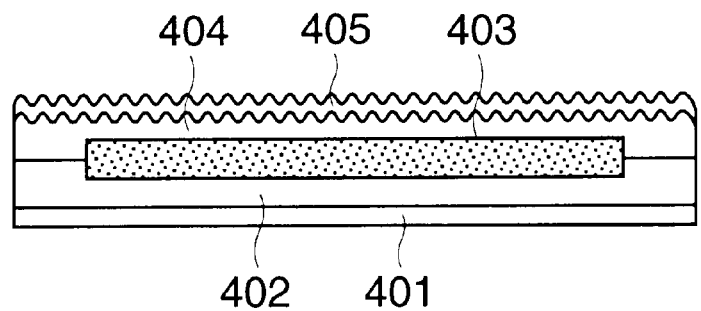
FIG. 10 illustrates solar cell modules integral with a roof, to form a monolithic structure (in sectional view)

The solar cell modules to be integral with a roof include, but not limited to, single-crystalline, polycrystalline, microcrystalline and amorphous cells. It is preferable that the cells having almost the same area are connected in series/parallel or totally series. These modules are integral with a roofing material to form a monolithic structure, and designed to be installed on a roof in a manner similar that for common roofing materials. FIG. 10 illustrates one example of arrangement of the solar cell modules set on a roof.

The solar cell module illustrated in FIG. 10 is formed by laminating a back reinforcement plate 401 with a back coating material 402, solar cell 403, surface sealant 404 and surface coating material 405. This module can be bent in a section other than the power generating region, to have a function of roofing material. The back reinforcement plate 401 is required to be weather-proof, rigid and flexible, for which stainless steel, galvanizing-alloy-coated steel plates and the like are used. The back coating material 402 is required to be electrically insulating and durable, for which nylon, polyvinyl fluoride (PVF, tedler, etc.) and polyethylene terephthalate (PET) are favorably used.

The surface sealant 404 is required to be weather-proof, adhesive, filling, and resistant to heat, cold weather and mechanical impact, for which ethylene-vinyl acetate copolymer (EVA), ethylene-ethyl acrylate copolymer (EEA), polyolefin-based resin, urethane resin, silicone resin and fluorine resin are used. In particular, EVA is favorable because of its well-balanced properties for solar cells. The surface coating material 405 is required to have properties, such as weather-proof, resistance to staining and mechanical strength, which allow the solar cell module it protects to reliably work in outdoor conditions, for which polyvinylidene fluoride resin, polyvinyl fluoride resin and ethylene tetrafluoride-ethylene copolymer (ETFE) are favorably used.

(Solar cell string and parallel connection)

A solar cell string is a group of circuits for which solar modules are connected to each other in series, to allow the module array to generate a required output voltage. String voltage must be within a range of inverter input voltage.

For configuring a solar cell module array system, number of strings, i.e., number of solar cell module series, is determined from range of inverter input voltage, and a plurality of the strings are connected in series. Number of modules that constitute a string is traditionally kept constant. This arrangement, however, may cause some problems. Consider that a total of 82 modules can be installed on a plane. When number of modules for each string is limited to 10 to 20 from range of inverter input voltage, a total of 80 modules can be installed at the maximum, by a configuration of 10-series/8-parallel, 16-series/5-parallel or 20-series/4-parallel, in spite of available space for additional 2 modules.

This type of problems can be solved by connecting different types of modules in series. In such a case, an array is composed of strings each consisting of 2 or more different types of modules connected in series. Taking the above configuration as an example, a total of 82 modules can be installed using 16 series consisting of 3 strings and 17 series consisting of 2 strings, which are connected in parallel. In this case, string voltage mismatch causes some voltage loss, which can be sufficiently offset by gains at 2 additional modules. It is accepted that connecting different types of modules in series allows more modules to be installed and produces a higher output than the conventional array configuration.

The present invention is described in detail by the following Examples.

EXAMPLE 1

Solar cell modules are to be installed on a gale roof, with a length of 4,500 mm in the shed direction, on the 10,000 mm long eaves and 10,000 mm long ridge. The gaps representing the installation-feasible range are set at 0 mm as the length from the eaves edge to the installation-feasible boundary, 200 mm as the length from the ridge edge to the installation-feasible boundary and 100 m as the length from the roof boundary (roof edge) to the installation-feasible boundary. The 2,000 mm long solar cell modules (medium) having a working width of 200 mm and 1,500 mm long solar cell modules (small) having a working width of 200 mm are arranged on the installation-feasible range in a tongue-and-groove manner, shown in FIG. 8. The solar cell module (medium) consists of the solar cells of almost the same size in an 8-series/1-parallel arrangement, and the solar cell module (small) consists of the solar cells having the same size as those for the module (medium) in a 6-series/1-parallel arrangement. Therefore, these modules share almost the same electric current characteristics. Flow to determine the module arrangement on the roof is briefly described below:

[Determination of the maximum installation-feasible number of rows]

Length A of the installation-feasible range in the shed direction of roof is A=4,500−200=4,300 mm. The maximum number of rows is the largest integer that satisfies the relationship:

Number of rows≦A/working width of the solar cell module

One may find number of rows by substituting A=4,300 (mm) in the above inequality:

Number of rows≦4300/200=21.5

Therefore, the maximum installation-feasible number of rows is 21.

[Determination of the maximum installation-feasible number of modules in each row]

The maximum installation-feasible number of modules in each row is the largest integer that satisfies the following inequality:

Maximum installation-feasible number of modules in each row≦B/length of solar cell module where, B is length of the installation-feasible range in the horizontal direction of roof. One may find the maximum installation-feasible number of modules in each row by substituting B=10000−100×2=9800 (mm) into the above inequality:

Maximum installation-feasible number of modules in each row≦9800/2000=4.9

Therefore, the maximum installation-feasible number of modules in each row is 4.

[Determination whether one or more modules can be installed in the dead space]

Length of the dead space in each row is 9800−2000×4=1800 (mm), and the 1500 mm long solar cell module (small) can be installed in the dead space.

In the above case, the maximum installation-feasible number of modules is 84 for the solar cell module (medium) and 21 for the solar cell module (small).

[Installation of the modules in the roof center]

The maximum installation-feasible number of the modules in each row, determined above, are installed on the roof center.

[Module offset]

The modules are staggered left, then right, by 100 mm row by row.

[Matching with inverter]

Use of a Canon's inverter SR-04 (input voltage range: 100 to 350V) is considered. Number of the solar cells which can be connected each other in series to form a string is the integer which satisfies the following inequalities:

100/(Minimum cell Vpm)≦cell series number

350/(Maximum cell Voc)≧cell series number

One may find that number of cells connectable to each other for a string in this case is 79 to 165 by substituting minimum cell Vpm of 1.28V and maximum cell Voc of 2.12V into the above inequalities. An arrangement with 12 modules (medium, having 8 cells) connected in series and 3 modules (small, having 6 cells) connected also in series has a cell series number of 8×12+6×3=114. This series number of cells can be arranged in the installation-feasible range. When these series are connected in 7-parallel, the maximum installation-feasible number of modules can be installed, i.e., 84 solar cell modules (medium) and 21 solar cell modules (small).

In the above arrangement, the filling ratio (area on which the solar cell modules are set/installation-feasible range area) is 94.7%. The method of the present invention allows the modules to be installed at a very high filling ratio, because the maximum installation-feasible number of the modules can be totally installed. As shown in FIG. 8, a group of solar cell modules (solar cell module array) are installed on the roof center, bilaterally symmetrically around the centerline, and, at the same time, the roof surface is mostly occupied by the solar cell modules. This arrangement is excellent in the beauty, providing no feel of mismatch between the modules and the dead space made of a common roofing material.

Comparative Example 1

Figure 11:
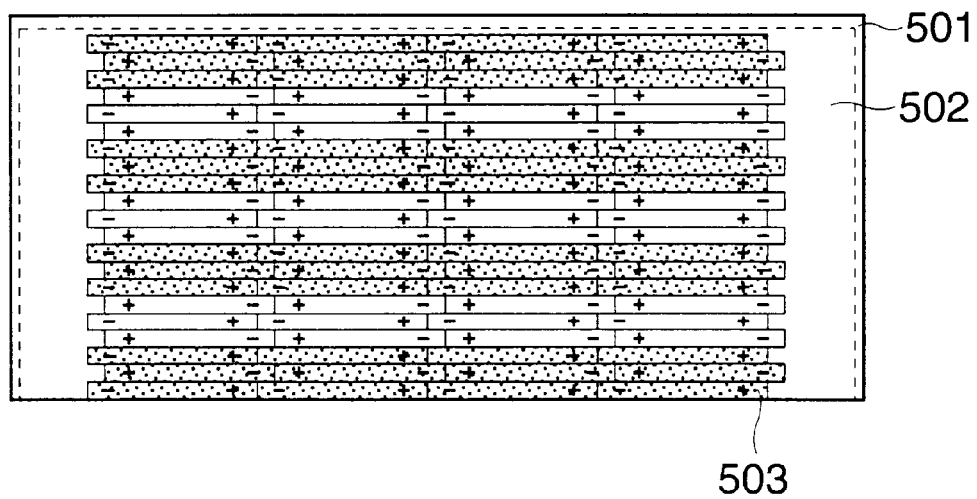
FIGS. 11 and 12 illustrate solar cell modules of the same type, installed on the plane illustrated in FIG. 8 (Comparative Examples)

Only the solar cell modules (medium) are installed on the same roof as that shown in FIG. 8 in the same tongue-and-groove manner, in a 12-series/7-parallel arrangement by a Canon's inverter SI-04. The maximum installation-feasible number of modules in this case is 84, giving a filling ratio of 79.7%. This arrangement is shown in FIG. 11, where 501 is the plane on which the modules are set, 502 is the installation-feasible range, and 503 is the solar cell module.

Comparative Example 2

Figure 12:
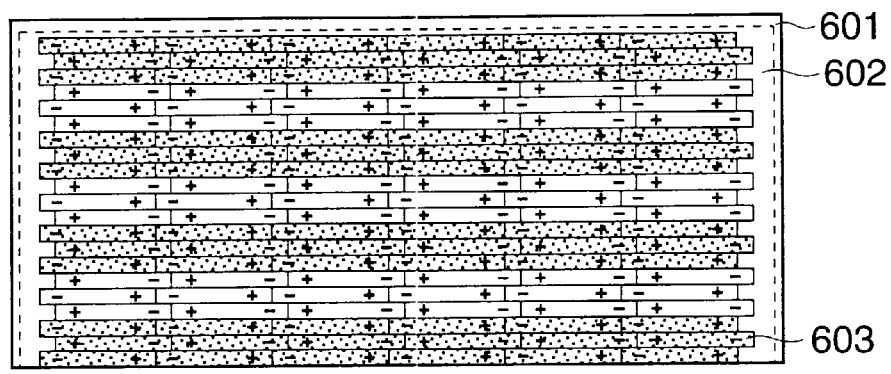

Only the solar cell modules (small) are installed on the same roof as that shown in FIG. 8 in the same tongue-and-groove manner, in a 18-series/7-parallel arrangement by a Canon's inverter SI-04. The maximum installation-feasible number of modules in this case is 126, giving a filling ratio of 89.7%. This arrangement is shown in FIG. 12, where 601 is the plane on which the modules are set, 602 is the installation-feasible range, and 603 is the solar cell module.

<Results>

Example 1, and Comparative Examples 1 and 2 install the modules of the same width on the same gale roof in dimensions and installation-feasible range. Example 1 uses two types of modules, whereas Comparative Examples 1 and 2 use only one type of the modules. Example 1 gives a filling ratio of 94.7%, whereas Comparative Examples 1 and 2 give 79.7 and 89.7%, respectively. It is thus demonstrated that arrangement of modules of different length can utilize the dead space more efficiently, giving a higher filling ratio, than that of the modules of the same length.

EXAMPLE 2

Figure 13:
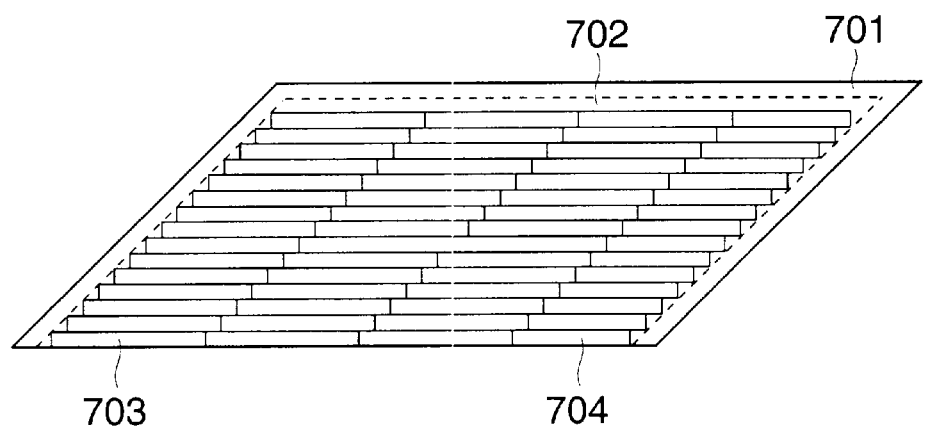
FIG. 13 illustrates solar cell modules installed on a parallelogram plane by the method of the present invention (Example)

Solar cell modules are to be installed on a parallelogram roof slanted at 45°, with a length of 3,400 mm in the shed direction, on the 8,400 mm long eaves and 8,400 mm long ridge. The gaps representing the installation-feasible range are set at 0 mm as the length from the eaves edge to the installation-feasible boundary, 220 mm as the length from the ridge edge to the installation-feasible boundary and 200 mm as the length from the roof boundary to the installation-feasible boundary. This arrangement is shown in FIG. 13, where 701 is the plane on which the modules are set, 702 is the installation-feasible range, 703 is the solar cell module (medium) and 704 is the solar cell module (small). The 2,000 mm long solar cell modules (medium) 703 having a working width of 200 mm and 1,500 mm long solar cell modules (small) 704 having a working width of 200 mm are arranged on the installation-feasible range 702. Flow to determine the module arrangement on the roof is briefly described below, where matching with inverter is not considered:

[Determination of the maximum installation-feasible number of rows]

First, the case of installing only the modules (medium) is considered:

Length A of the installation-feasible range in the shed direction of roof is A=3,400−220=3,180 (mm). The maximum number of rows is the largest integer that satisfies the relationship:

Number of rows≦$A$/working width of the solar cell module

One may find number of rows by substituting A=3,180 mm in the above inequality:

Number of rows≦3180/200=15.9

Therefore, the maximum installation-feasible number of rows is 15.

[Determination of the maximum installation-feasible number of modules in each row]

The maximum installation-feasible number of modules in each row is the largest integer that satisfies the following inequality:

Maximum installation-feasible number of modules in each row≦$B$/length of solar cell module One may find the maximum installation-feasible number of modules in each row by substituting B=8400−200×2−200×2=7600 (mm) into the above inequality:

Maximum installation-feasible number of modules in each row≦7600/2000=3.8

Therefore, the maximum installation-feasible number of modules in each row is 3.

[Determination whether one or more modules can be installed in the dead space]

Length of the dead space in each row is 7600−2000×3=1600 (mm), and the 1500 mm long solar cell module (small) can be installed in the dead space.

In the above case, the maximum installation-feasible number of modules is 45 for the solar cell module (medium) and 15 for the solar cell module (small), giving a filling ratio of 88.4%.

Comparative Example 3

Figure 14:
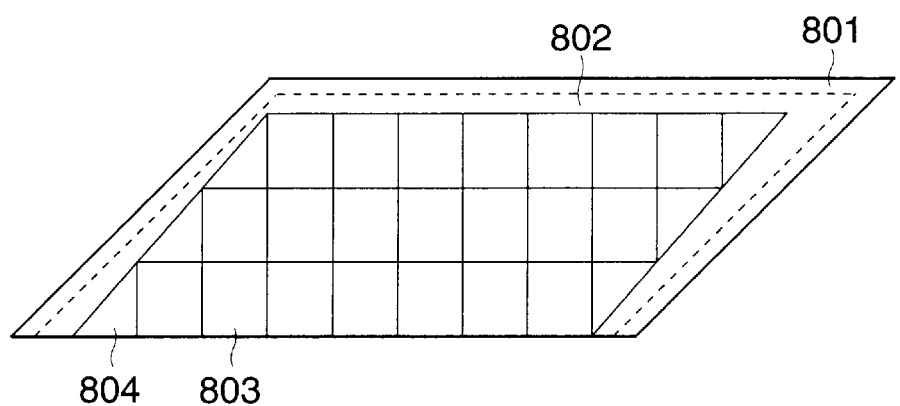
FIG. 14 illustrates rectangular and triangular solar cell modules installed on the plane illustrated in FIG. 13 (Comparative Examples)

The rectangular cell modules (869 mm by 982 mm) and right triangular cell modules (982 mm and 869 mm long sides including the right angle) are installed on a frame placed on the same roof and the same installation-feasible range as that for Example 2. This arrangement is shown in FIG. 14, where 801 is the plane on which the module-carrying frame is set, 802 is the installation-feasible range, and 803 and 804 are the rectangular and triangular solar cell modules, respectively. In this arrangement, the edges of the modules in the adjacent 2 rows are trued up, with the triangular modules 804 being set where the rectangular modules 803 can not be set, to maximize number of the modules on the installation-feasible range. The filling ratio in this case is 80.5%.

EXAMPLE 3

Figure 15:
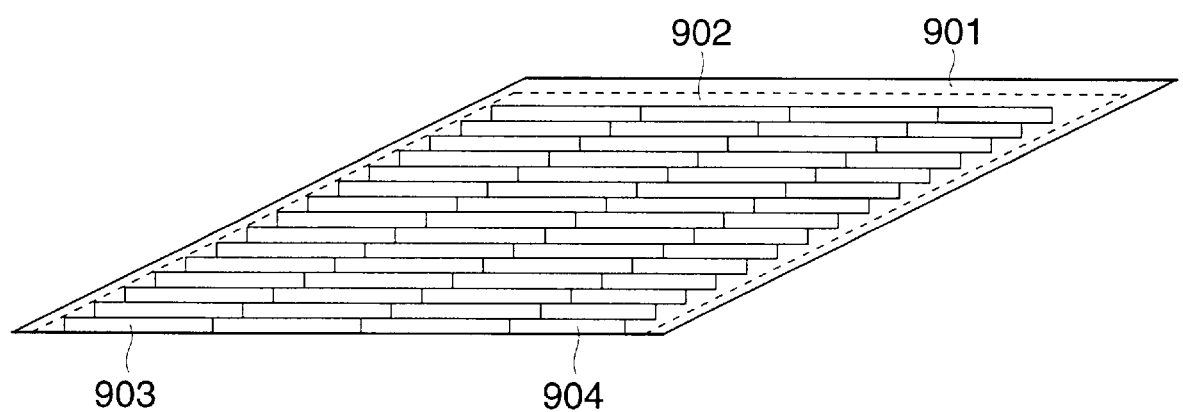
FIG. 15 illustrates solar cell modules installed on a parallelogram plane by the method of the present invention (Example)

Solar cell modules are to be installed on a parallelogram roof slanted at 26.565°, with a length of 3,400 mm in the shed direction, on the 8,720 mm long eaves and 8,720 mm long ridge. The gaps representing the installation-feasible range are set at 0 mm as the length from the eaves edge to the installation-feasible boundary, 300 mm as the length from the ridge edge to the installation-feasible boundary and 200 mm as the length from the roof boundary to the installation-feasible boundary. This arrangement is shown in FIG. 15, where 901 is the plane on which the modules are set, 902 is the installation-feasible range, and 903 and 904 are the medium and small solar cell modules, respectively. In this example, the 2,000 mm long solar cell modules (medium) 903 having a working width of 200 mm and 1,500 mm long solar cell modules (small) 904 having a working width of 200 mm are arranged on the installation-feasible range 901. Flow to determine the module arrangement is the same as that for Example 2.

In the above case, the maximum installation-feasible number of modules is 45 for the solar cell module (medium) and 15 for the solar cell module (small), giving a filling ratio of 87.2%.

Comparative Example 4

Figure 16:
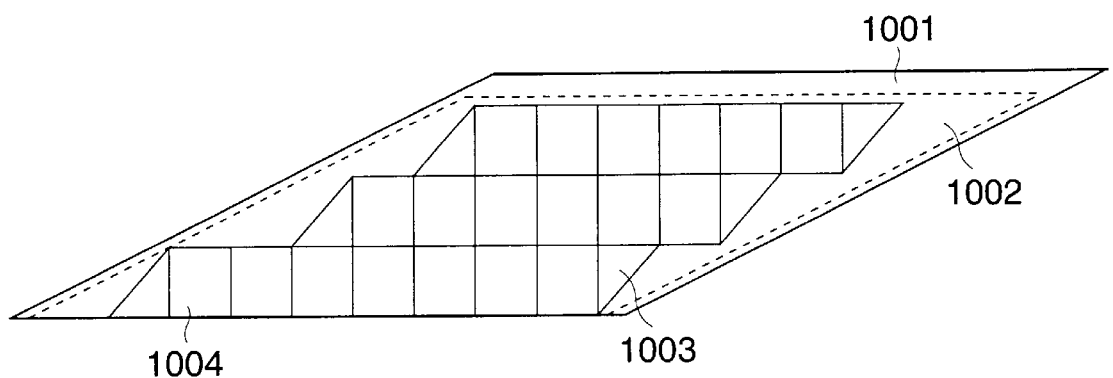
FIG. 16 illustrates rectangular and triangular solar cell modules installed on the plane illustrated in FIG. 15 (Comparative Examples)

The rectangular cell modules 1004 (869 mm by 982 mm) and right triangular cell modules 1003 (982 mm and 869 mm long sides including the right angle) are installed on a frame placed on the same plane 1001 and on the same installation-feasible range 1002 as that for Example 3. This arrangement is shown in FIG. 16. In this arrangement, the edges of the modules in the adjacent 2 rows are trued up, with the triangular modules 1003 being set where the rectangular ones 1004 can not be set, to maximize number of the modules on the installation plane 1001. The filling ratio in this case is 72.8%.

<Results>

Example 2 and Comparative Example 3 install the modules on the same parallelogram plane in dimensions and installation-feasible range. Example 3 and Comparative Example 4 also install the modules on the same parallelogram plane in dimensions and installation-feasible range.

Comparing the results by Example 2 with those by Comparative Example 3, it is found that the arrangement with 2 types of the rectangular solar cell modules of the same width but different length has a higher filling ratio than the arrangement with the rectangular and triangular modules, and that decreasing width of the module decreases dead space in each row.

Comparing the results by Example 3 with those by Comparative Example 4, it is found that filling ratio tends to decrease, when roof boundary line angle is much different from triangle angle, because of increased mismatch between the dead space, which results from use of only rectangular modules, and triangular shape. However, use of narrower rectangular modules of the same width but different length can reduce dead space in each row, to increase filling ratio, as shown in Example 3. This arrangement is applicable to various installation plane shapes, increasing design freedom.

EXAMPLE 4

Figure 17:
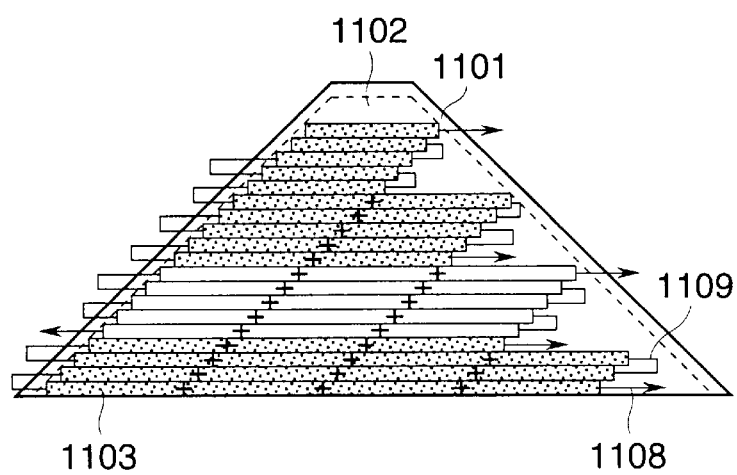
FIG. 17 illustrates solar cell modules of the same type, installed on a trapezoidal plane (Comparative Examples)
Figure 18:
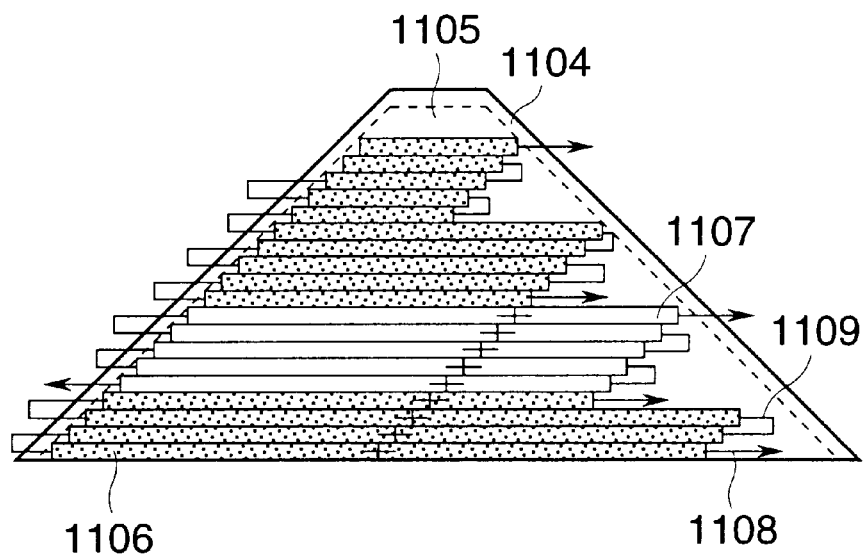
FIG. 18 illustrates the solar cell modules illustrated in FIG. 17 which are replaced by modules of another type by the method of the present invention (Example)

The 4,000 mm long solar cell modules (large) having a working width of 200 mm and 2,000 mm long solar cell modules (medium) having a working width of 200 mm are to be installed on a hip roof, with a length of 4,900 mm in the shed direction, on the 10,000 mm long eaves and 1,000 mm long ridge. The gaps representing the installation-feasible range are set at 0 mm as the length from the eaves edge to the installation-feasible boundary, 200 mm as the length from the ridge edge to the installation-feasible boundary and 200 mm as the length from the roof boundary to the installation-feasible boundary. The arrangements are shown in FIGS. 17 and 18, where 1101 is the plane on which the modules are set, 1102 is the installation-feasible range, and 1103 is the medium solar cell module, and 1108 is a cable from the string and 1109 is a cable which connects the modules to each other in FIG. 17; and 1104 is the plane on which the modules are set, 1105 is the installation-feasible range, and 1106 and 1107 are the large and medium solar cell modules, respectively, in FIG. 18. The solar cell module (large) consists of the solar cells in a 16-series/1-parallel arrangement, and the solar cell module (medium) consists of the solar cells having almost the same size as those for the module (large) in a 8-series/1-parallel arrangement. Flow to determine the module arrangement on the roof is briefly described below:

[Determination of the maximum installation-feasible number of rows]

First, only the modules (medium) are used to design the module layout. Length A of the installation-feasible range in the shed direction is A=4,500−200=4,300 (mm). The maximum number of rows is the largest integer that satisfies the relationship:

Number of rows ≦ $A$/working width of the solar cell module

One may find number of rows by substituting A=4,300 mm in the above inequality:

Number of rows ≦ 4300/200=21.5

Therefore, the maximum installation-feasible number of rows is 21.

[Determination of the maximum installation-feasible number of modules in each row]

The maximum installation-feasible number of modules in each row is the largest integer that satisfies the following inequality:

Maximum installation-feasible number of modules in each row ≦ $B$/length of solar cell module where, B is length of the upper side of the row in the installation-feasible range, which varies row by row. At the 10th row from the eaves, for example, B=5,600 mm. The maximum installation-feasible number of modules at this row is the largest integer that satisfy the inequality:

Maximum installation-feasible number of modules in each row ≦ 5600/2000=2.8

Therefore, the maximum installation-feasible number of modules at the 10th row is 2.

[Matching with inverter]

Use of a Canon's inverter SR-04 (input voltage range: 100 to 350V) is considered. Number of the solar cells for a string is 79 to 165, as determined from the input voltage range of the inverter. Knowing that the solar cell module (medium) consists of 8 cells, number of module series is an integer that satisfy the following inequality:

79/8 ≦ number of module series ≦ 165/8

Therefore, the number of module series is 10 to 20. The maximum installation-feasible number of modules in this case is 45. All of these modules can be installed by an arrangement of 15-series/3-parallel, as shown in FIG. 17. Number of connections between the modules is 42, when only the solar cell modules (medium) are used.

It should be noted that 2 series of the solar cell modules (medium) corresponds to one solar cell module (large). It is therefore possible to use one solar cell module (large) 1106 instead of 2 solar cell modules (medium) connected in series at a site free of boundary with a string in a row. In this case, the number of connections between the modules is 25.

<Results>

Example 4 installs one module type (FIG. 17), and two module types having the same width but different lengths (FIG. 18) on the roofs and installation-feasible ranges having the same dimensions. Numbers of connections between the modules are 42 and 25, respectively. It is therefore possible to reduce connections between modules by replacing two shorter modules by one longer module, to improve installation efficiency.

EXAMPLE 5

Figure 19:
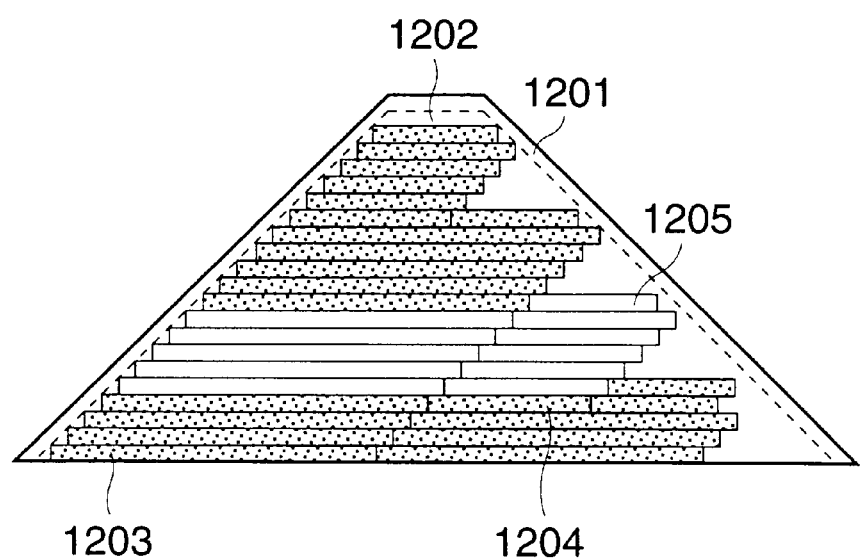
FIG. 19 illustrates 3 types of solar cell modules installed on the plane illustrated in FIG. 17 by the method of the present invention (Example)

The large, medium and small solar cell modules are to be installed on the same installation-feasible range on the same roof as those for Example 4. The arrangement is shown in FIG. 19, where 1201 is the plane on which the modules are set, 1202 is the installation-feasible range, and 1203, 1204 and 1205 are the large, medium and small solar cell modules, respectively. These modules different in size are connected in series by a Canon's inverter SI-04. Flow to determine the module arrangement is briefly described below:

The same steps from "determination of the maximum installation feasible number of modules in each row" to the "exchange of the modules" as those for Example 4 are used.

[Determination whether one or more modules can be installed in the dead space]

Installation of the 1.5 m long solar cell modules (small) in the dead space is considered. They can be installed in the 4th, 5th, 10th, 15th and 20th rows from the eaves, and the modules (small) are installed in these rows.

[Matching with inverter (connection of modules of different types in series)]

Use of a Canon's inverter SI-04 is considered. Number of the solar cells connectable in series is 79 to 165, as determined from the input voltage range of the inverter. An array consisting of 3 strings connected in parallel is formed, where these strings consist of 7 solar modules (large)+1 solar module (medium)+2 solar cell modules (small) having a total of 132 cells; 5 solar modules (large)+5 solar modules (medium)+1 solar cell module (small) having a total of 126 cells, and 5 solar modules (large)+5 solar modules (medium)+2 solar cell modules (small) having a total of 132 cells.

As shown above, Example 5 can install additional modules in the dead space as compared with Example 4, because the former no longer needs to consider the limitation of setting the same voltage for all the strings involved, securing a higher output gain. Thus, connecting modules of different sizes provides the array design with larger freedom.

EXAMPLE 6

The solar cell module array installed by the method of the present invention is connected to a utility power supply system with a reverse power flow for a residence. This arrangement is shown in FIG. 20, where 1301 is the plane on which the modules are set, 1302 is the solar cell module, 1303 is the solar cell string, 1304 is the solar cell module array, 1305 is a connection box, 1306 is an inverter, 1307 is a distribution board, 1308 is a load, and 1309 and 1310 are watthour meters for excess and demand power, respectively.

It is possible to increase filling ratio of solar cell modules on a plane, and thereby increasing power output, by arranging two or more types of narrow, rectangular modules having the same width but different lengths. Different types of modules having the same width but different lengths can be arranged easily, when these modules have almost the same electric current characteristics. It is also possible to provide the array design with larger freedom by arranging different types of modules connected in series, because this arrangement no longer needs to consider the limitation of setting the same voltage for all the strings involved.

What is claimed is:

1. A solar cell module array comprising
a plurality of rectangular solar cell modules arranged in a row, wherein each individual rectangular solar cell module comprises a plurality of individual solar cells, wherein the solar cell modules comprising said row are of at least two different lengths measured in a direction of the row.

2. A solar cell module array of claim 1, wherein said solar cell modules all have the same width.

3. A solar cell module array of claim 1, wherein said solar cell modules are connected to each other in series to form a solar cell string.

4. A solar cell module array of claim 3, wherein said solar cell module array is comprised of a plurality of said solar cell strings, and said strings are connected in parallel.

5. A solar cell module array of claim 4, wherein said solar cell strings are connected to an inverter.

6. A solar cell module array of claim 4, wherein said solar cell strings are arranged according to the number of solar cell modules in each string.

7. A solar cell module array of claim 1, wherein all of said solar cell modules have the same electric current characteristics.

8. A solar cell module array of claim 1, wherein each of said solar cell modules is comprised of two or more solar cells, and all of said solar cells have the same size light-receiving area.

9. A solar cell module array of claim 8, wherein all of said solar cells are of the same length and each of said solar cell modules has a length that is an integer multiple of the length of said solar cells.

10. A solar cell module array of claim 1, wherein said modules are integrated with a roofing material.

11. The solar cell module array according to claim 1, wherein said array has a plurality of solar cell strings that are comprised of a plurality of solar cell modules connected to each other in series, and wherein the solar cell modules are arranged according to module length.

12. The solar cell module array according to claim 11, wherein said solar cell strings are arranged according to the number of solar cell modules in said solar cell string.

13. A roof provided with a solar cell system comprised of a plurality of rectangular solar cell modules installed on an installation plan in a row, wherein each individual rectangular solar cell module comprises a plurality of individual solar cells, wherein the solar cell modules comprising said row are of at least two different lengths measured in a direction of the row.

14. A roof provided with a solar cell system of claim 13, wherein said solar cell modules all have the same width.

15. A roof provided with a solar cell system of claim 13, wherein said modules are connected to each other in series to form a solar cell string.

16. A roof provided with a solar cell system of claim 13, wherein said solar cell system is comprised of a solar cell module array, and the module array is comprised of a plurality of said solar cell strings, and said strings are connected in parallel.

17. A roof provided with a solar cell system of claim 16, wherein said solar cell strings are connected to an inverter.

18. A roof provided with a solar cell system of claim 16, wherein said solar cell strings are arranged according to the number of solar cell modules in each string.

19. A roof provided with a solar cell system of claim 13, wherein all of said solar cell modules have the same electric current characteristics.

20. A roof provided with a solar cell system of claim 13, wherein each of said solar cell modules are comprised of two or more solar cells, and all of said solar cells have the same size light-receiving area.

21. A roof provided with a solar cell system of claim 20, wherein all of said solar cells are of the same length and each of said solar cell modules has a length that is an integer multiple of the length of said solar cells.

22. A roof provided with a solar cell system of claim 13, wherein said roof is comprised of a roofing material having said solar cell module and integrated with said solar cell module, and a roofing material not having said solar cell modules.

23. The roof having a solar cell system according to claim 13, wherein said solar cell system is comprised of a solar cell module array, and the array has a plurality of solar cell strings that are comprised of a plurality of solar cell modules connected to each other in series, and wherein the solar cell modules are arranged according to module length.

24. The roof having a solar cell system according to claim 23, wherein said solar cell strings are arranged according to the number of said solar cell modules in said solar cell string.

25. A method for installing two or more rectangular solar cell modules, wherein each individual rectangular solar cell module comprises a plurality of individual solar cells, on an installation plane comprising setting said modules in a row so that said solar cell modules comprising said row are of at least two different lengths measured in a direction of the row.

26. A method for installing two or more solar cell modules of claim 25, wherein said solar cell modules all have the same width.

27. A method for installing two or more solar cell modules of claim 25, wherein said solar cell modules are connected to each other in series to form a solar cell string.

28. A method for installing two or more solar cell modules of claim 25, wherein each of said solar cell modules are components of a solar cell module array, in which the solar cell module array is comprised of a plurality of said solar cell strings, and said strings are connected in parallel.

29. A method for installing two or more solar cell modules of claim 28, wherein said solar cell strings are connected to an inverter.

30. A method for installing two or more solar cell modules of claim 28, wherein said solar cell strings are arranged according to the number of solar cell modules in each string.

31. A method for installing two or more solar cell modules of claim 25, wherein all of said solar cell modules have the same electric current characteristics.

32. A method for installing two or more solar cell modules of claim 25, wherein each of said solar cell modules is comprised of two or more solar cells, and all of said solar cells have the same size light-receiving area.

33. A method of installing two or more solar cell modules of claim 32, wherein all of said solar cells are of the same length and each of said solar cell modules has a length that is an integer multiple of the length of said solar cells.

34. A method for installing two or more solar cell modules of claim 25, wherein said solar cell modules are integrated with a roofing material and a roof is formed by installing said solar cell modules.

35. A method for installing two or more solar cell modules of claim 34, further comprising a step of installing a roofing material having no solar cell modules on a portion on which said solar cell module is not installed.

36. The method for installing two or more solar cell modules according to claim 25, wherein all of said solar cell modules are components of a solar cell module array, in which the array has a plurality of solar cell strings, each of which is comprised of a plurality of said solar cell modules connected to each other in series, and wherein the solar cell modules are arranged according to module length.

37. The method for installing two or more solar cell modules according to claim 36, wherein said solar cell strings are arranged according to the number of said solar cell modules in each string.

38. A solar cell module array comprising a plurality of solar cell modules arranged in rows and columns, wherein the solar cell modules are rectangular, wherein each individual rectangular solar cell module comprises a plurality of individual solar cells, and the solar cell modules comprising at least one of the module rows are of at least two different lengths measured in a direction of the rows.

39. A roof provided with a solar cell system comprised of a plurality of solar cell modules installed on an installation plane in a row, wherein the solar cell modules are arranged in rows and columns, and the solar cell modules are rectangular, wherein each individual rectangular solar cell module comprises a plurality of individual solar cells, and the solar cell modules comprising at least one of the module rows are of at least two different lengths measured in a direction of the rows.

40. A method for installing two or more solar cell modules on an installation plane, wherein the solar cell modules are rectangular, wherein each individual rectangular solar cell module comprises a plurality of individual solar cells, comprising arranging the solar cell modules in rows and columns wherein the solar cell modules in at least one of the solar cell module rows are arranged to be of at least two different lengths measured in a direction of the rows.

41. A method for installing a plurality of rectangular solar cell modules, wherein each individual rectangular solar cell module comprises a plurality of individual solar cells, on a roof which said solar cell modules have been previously fabricated and are of at least two different lengths, which comprises the steps of:

calculating respective kind and number of the solar cell modules by a size of the roof;

calculating respective kind and number of the solar cell modules by a size of the roof; and installing the solar cell modules according to results obtained in the calculation step so that the solar cell modules comprising at least one row are of at least two different lengths measured in a direction of the row.

* * * * *

UNITED STATES PATENT AND TRADEMARK OFFICE
CERTIFICATE OF CORRECTION

PATENT NO.     : 6,525,262 B1
DATED          : February 25, 2003
INVENTOR(S)    : Hidehisa Makita et al.

It is certified that error appears in the above-identified patent and that said Letters Patent is hereby corrected as shown below:

Column 5,
Line 9, "module." should read -- modules. --;
Line 12, "provide" should read -- providing --;
Lines 13, 41 and 67, "not" should read -- are not --; and
Line 24, "a edge" should read -- an edge --.

Column 6,
Line 10, "is" should read -- are --;
Line 14, "not" should read -- are not --;
Line 19, "similar" should read -- similar to --; and
Line 32, "tedler," should read -- tedlar, --.

Column 7,
Line 15, "gale" should read -- gable --.

Column 8,
Line 21, "connected" should read -- connected to --.

Column 9,
Line 8, "gale" should read -- gable --.

Column 12,
Lines 13 and 25, "satisfy" should read -- satisfies --; and
Line 63, "installation feasible" should read -- installation-feasible --.

UNITED STATES PATENT AND TRADEMARK OFFICE
CERTIFICATE OF CORRECTION

PATENT NO. : 6,525,262 B1
DATED : February 25, 2003
INVENTOR(S) : Hidehisa Makita et al.

It is certified that error appears in the above-identified patent and that said Letters Patent is hereby corrected as shown below:

Column 16,
Lines 39 and 40 should be deleted.

Signed and Sealed this

Twenty-eighth Day of October, 2003

JAMES E. ROGAN
*Director of the United States Patent and Trademark Office*